(12) United States Patent
Martin

(10) Patent No.: US 8,325,899 B2
(45) Date of Patent: *Dec. 4, 2012

(54) TELEPHONE CALL SCREENING AND ROUTING DEVICE AND RELATED METHOD

(75) Inventor: Bradley J. Martin, Virginia Beach, VA (US)

(73) Assignee: Bradley J. Martin, Virginia Beach, VA (US)

( * ) Notice: Subject to any disclaimer, the term of this patent is extended or adjusted under 35 U.S.C. 154(b) by 83 days.

This patent is subject to a terminal disclaimer.

(21) Appl. No.: 12/957,611

(22) Filed: Dec. 1, 2010

(65) Prior Publication Data

US 2011/0069824 A1     Mar. 24, 2011

Related U.S. Application Data

(63) Continuation of application No. 11/010,541, filed on Dec. 13, 2004, now Pat. No. 7,860,230.

(60) Provisional application No. 60/529,400, filed on Dec. 12, 2003.

(51) Int. Cl.
*H04M 3/42* (2006.01)

(52) U.S. Cl. ......... 379/210.02; 379/210.03; 379/211.01; 379/211.02; 379/212.01; 379/142.04; 455/413; 455/415; 455/417; 455/567

(58) Field of Classification Search ............... 379/88.21, 379/88.19, 207.16, 210.02, 211.01, 214.01, 379/210.03, 211.02, 212.01, 142.04, 180; 455/415, 567, 413, 414.1, 417

See application file for complete search history.

(56) References Cited

U.S. PATENT DOCUMENTS

| | | | |
|---|---|---|---|
| 4,277,649 A | 7/1981 | Sheinbein | |
| 5,408,528 A | 4/1995 | Carlson et al. | |
| 5,473,671 A | 12/1995 | Partridge, III | |
| 5,602,908 A | 2/1997 | Fan | |
| 5,724,408 A | 3/1998 | Morganstein | |
| 5,995,603 A | 11/1999 | Anderson | |
| 6,014,559 A | 1/2000 | Amin | |
| 6,016,341 A | 1/2000 | Lim | |
| 6,085,080 A | 7/2000 | Rahikainen et al. | |
| 6,298,122 B1 | 10/2001 | Horne | |
| 6,473,422 B2 | 10/2002 | Hall et al. | |
| 6,549,619 B1 | 4/2003 | Bell et al. | |
| 6,567,671 B2 | 5/2003 | Amin | |
| 6,625,270 B1 | 9/2003 | Banwell et al. | |
| 6,701,160 B1 | 3/2004 | Pinder et al. | |
| 6,804,334 B1 | 10/2004 | Beasley et al. | |
| 6,807,256 B1 | 10/2004 | Holt et al. | |
| 6,816,577 B2 | 11/2004 | Logan | |
| 7,127,238 B2 | 10/2006 | Vandermeijden et al. | |
| 7,177,631 B2 | 2/2007 | Amin | |
| 7,184,527 B1 | 2/2007 | Lin et al. | |
| 2002/0196913 A1* | 12/2002 | Ruckart | 379/88.19 |

* cited by examiner

*Primary Examiner* — Antim Shah
(74) *Attorney, Agent, or Firm* — Snell & Wilmer LLP

(57) ABSTRACT

A method for screening and routing incoming telephone calls includes extracting caller identification information from an incoming telephone call, providing a plurality of tables including a primary ring table, a secondary ring table, a voicemail table, a block call table, and a forward call table, and determining which one of the plurality of tables includes the caller identification information. The method further includes sending the incoming telephone call directly to voicemail without having a ring tone if the voicemail table includes the caller identification information, blocking the incoming telephone call if the block call table includes the caller identification information, and forwarding the incoming telephone call if the forward call table includes the caller identification information.

13 Claims, 4 Drawing Sheets

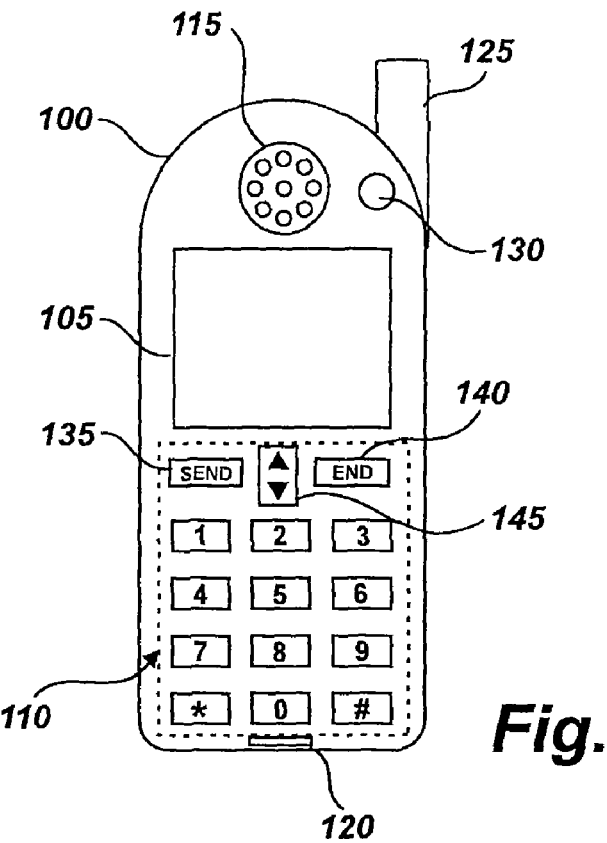
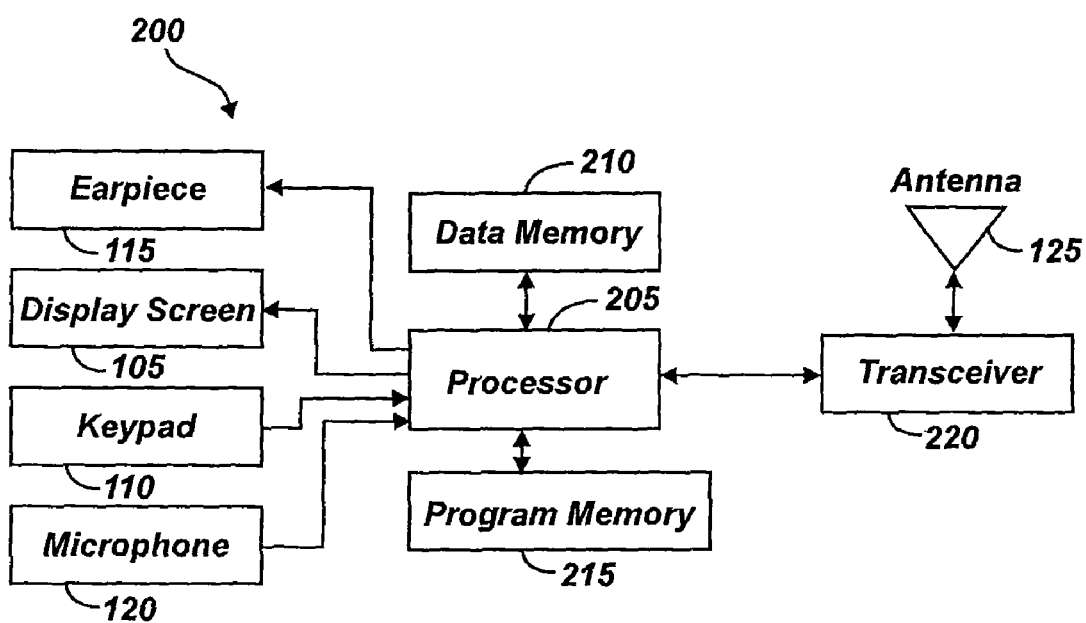
Fig. 1
Fig. 2

300

| Primary Ring Table 305 | Secondary Ring Table 310 | Voicemail Table 315 | Block Call Table 320 | Foward Call Table 325 |
|---|---|---|---|---|
| Spouse<br>800-111-1111<br>Child #1<br>800-111-2222<br>Child #2<br>800-111-3333 | Mother<br>800-222-1111<br>Father<br>800-222-2222<br>Friend #1<br>800-222-3333<br>Friend #2<br>800-222-4444 | Mother-in-Law<br>800-333-1111<br>Father-in-Law<br>800-333-2222<br>All Telephone numbers or names not listed in any of the tables | Former Girlfriend<br>800-444-1111<br>Ex-Wife<br>800-444-2222<br>Solicitor #1<br>800-444-3333<br>Caller Unavailable | Boss<br>800-555-1111<br>Client #1<br>800-555-2222<br>Patient #1<br>800-555-3333 |

| Name 405 | Number 410 | Identifier 415 | Forwarding Number 420 |
|---|---|---|---|
| Boss | 800-555-1111 | FC | 800-666-1111 |
| Child #1 | 800-111-2222 | PR | |
| Child #2 | 800-111-3333 | PR | |
| Client #1 | 800-555-2222 | FC | 800-666-2222 |
| Ex-Wife | 800-444-2222 | BC | |
| Father | 800-222-2222 | SR | |
| Father-in-Law | 800-333-2222 | VM | |
| Former Girlfriend | 800-444-1111 | BC | |
| Friend #1 | 800-222-3333 | SR | |
| Friend #2 | 800-222-4444 | SR | |
| Mother | 800-222-1111 | SR | |
| Mother-in-Law | 800-333-1111 | VM | |
| Patient #1 | 800-555-3333 | FC | 800-666-3333 |
| Solicitor #1 | 800-444-3333 | BC | |
| 425 → Spouse | 800-111-1111 | PR | |
| Caller Unavailable | | BC | |
| All Other Calls | | VM | |

*Fig. 4*

TELEPHONE CALL SCREENING AND ROUTING DEVICE AND RELATED METHOD

CROSS-REFERENCE TO RELATED APPLICATIONS

This application claims the benefit of priority from and is a continuation of U.S. application Ser. No. 11/010,541, filed Dec. 13, 2004 now U.S. Pat. No. 7,860,230, which in turn claims the benefit of priority from U.S. Provisional Patent Application Ser. No. 60/529,400, filed Dec. 12, 2003. Both of these applications are hereby incorporated by reference.

FIELD OF THE INVENTION

The invention relates generally to the screening and routing of telephone calls, and more particularly to a telephone call screening and routing device and related method.

DESCRIPTION OF THE RELATED ART

With the widespread use of telephones, in particular cellular telephones, telephone users are able to make and receive many more telephone calls a day. However, many received telephone calls are unwanted telephone calls, such as solicitations, telemarketers, wrong numbers, or calls the telephone user does not want to answer. In order to avoid some of these telephone calls, many telephone users request that their numbers be unlisted to prevent a large number of third parties from calling the telephone user. Nonetheless, once the telephone user gives out his/her telephone number, a possibility exists that the telephone number will be obtained by unwanted callers.

In an attempt to screen unwanted telephone calls, many telephone users subscribe to a service called caller identification (ID). Each telephone call is generally preceded with caller ID information that identifies the telephone number of the calling party. The caller ID information (i.e., the telephone number of the calling party) is displayed on the telephone display to allow the telephone user to view this information prior to answering the telephone call. Depending on the caller ID information, the telephone user may answer the telephone or allow the telephone to continue to ring until the answering machine or voicemail system picks up the telephone call.

On the other hand, the calling party may conceal its identity by subscribing to a service called caller ID block. Caller ID block allows the telephone caller to prevent the telephone user from knowing the identity of the caller. Therefore, the telephone user may have to risk answering the telephone call, just to find out that the call is from an unwanted caller. Alternatively, the telephone user may allow the phone to continue to ring until the answering machine or voicemail system picks up the telephone. The unwanted caller and the continuous ringing of the telephone may be disruptive, distracting and irritating to the telephone user. Thereafter, the telephone user will have to check its messages or voicemails to possibly determine the identity of the caller and the contents of the message.

SUMMARY OF THE INVENTION

In particular, and by way of example only, one embodiment of the invention is a method for screening and routing an incoming call from a caller. The method includes receiving an incoming telephone signal including caller identification information from a caller and identifying an entry in a data set that matches the caller identification information. The method also includes extracting an identifier from the entry in the data set and, based on the identifier, selecting one of a set including (1) sending a primary ring signal, (2) sending a secondary ring signal, (3) sending a voicemail signal, (4) sending a block call signal, and (5) sending a forward call signal.

One embodiment of the invention is a method for screening and routing incoming telephone calls. The method includes extracting caller identification information from an incoming telephone call, providing a plurality of tables including a primary ring table, a secondary ring table, a voicemail table, a block call table, and a forward call table, and determining which one of the plurality of tables includes the caller identification information. The method also includes allowing the incoming telephone call to have a primary ring tone if the primary ring table includes the caller identification information, and allowing the incoming telephone call to have a secondary ring tone if the secondary ring table includes the caller identification information. The method further includes sending the incoming telephone call directly to voicemail without having a ring tone if the voicemail table includes the caller identification information, blocking the incoming telephone call if the block call table includes the caller identification information, and forwarding the incoming telephone call if the forward call table includes the caller identification information.

One embodiment of the invention is a device for screening and routing incoming telephone calls. The device includes a transceiver for receiving an incoming telephone call including caller identification information and a memory for storing a plurality of entries where each entry has an identifier selected from one of a set including (1) a primary ring, (2) a secondary ring, (3) a voicemail, (4) a block call, and (5) a forward call. The device also includes a processor for matching the caller identification information to one of the plurality of entries and for allowing the incoming telephone call to have a primary ring tone if the identifier of the matched entry is the primary ring, allowing the incoming telephone call to have a secondary ring tone if the identifier of the matched entry is the secondary ring, sending the incoming telephone call directly to voicemail without having a ring tone if the identifier of the matched entry is the voicemail, blocking the incoming telephone call if the identifier of the matched entry is the block call, and forwarding the incoming telephone call if the identifier of the matched entry is the forward call.

These and other features and advantages of the embodiments of the invention will become apparent from the following detailed description, taken in conjunction with the accompanying drawings, which illustrate, by way of example, the principles of the invention.

BRIEF DESCRIPTION OF THE DRAWINGS

FIG. 1 is a front view of a cellular telephone having a display and a keypad for implementing an embodiment of the invention;

FIG. 2 is a block diagram illustrating the principal components of the cellular telephone for implementing an embodiment of the invention;

FIG. 3 illustrates a main table including, for example, a primary ring table, a secondary ring table, a voicemail table, a block call table, and a forward call table that are used for screening and routing of telephone calls according to an embodiment of the invention;

FIG. 4 illustrates an address book having an alphabetical listing of names and numbers with identifiers that specify the screening and/or routing operation that is performed when a telephone call is received from the listed number according to an embodiment of the invention;

DETAILED DESCRIPTION OF THE PREFERRED EMBODIMENTS

Figure 5:
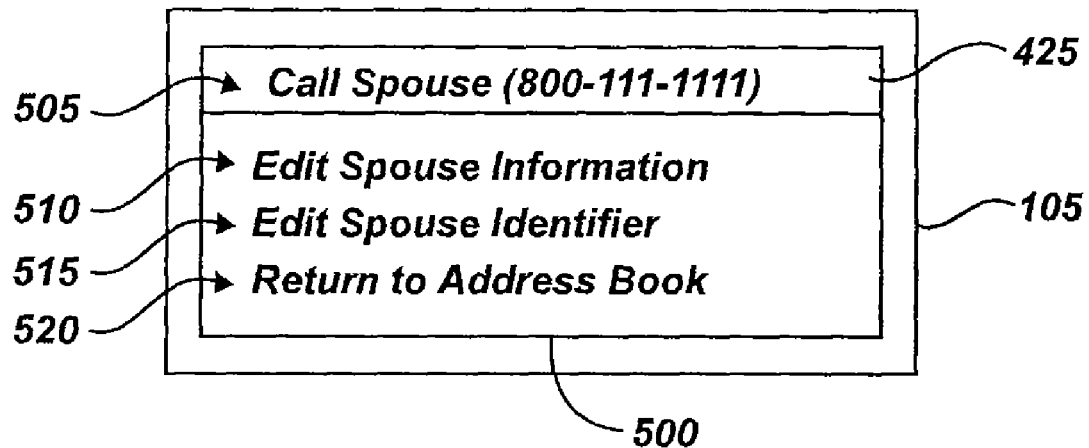
FIG. 5 is a menu or window that is displayed on the display screen when the telephone user selects one of the names and/or numbers in the address book according to an embodiment of the invention.

Systems and methods that implement the embodiments of the various features of the invention will now be described with reference to the drawings. The drawings and the associated descriptions are provided to illustrate embodiments of the invention and not to limit the scope of the invention. Reference in the specification to "one embodiment" or "an embodiment" is intended to indicate that a particular feature, structure, or characteristic described in connection with the embodiment is included in at least an embodiment of the invention. The appearances of the phrase "in one embodiment" in various places in the specification are not necessarily all referring to the same embodiment. Throughout the drawings, reference numbers are re-used to indicate correspondence between referenced elements. In addition, the first digit of each reference number indicates the figure in which the element first appears.

Referring now more particularly to the drawings, FIG. 1 is a front view of a cellular telephone 100 having a display screen 105 and a keypad 110 for implementing an embodiment of the invention. The display screen 105 is typically a backlit liquid crystal display (LCD) panel. The keypad 110 includes numeric keys for dialing and allowing the telephone user to input information (e.g., numbers, letters, or commands) into the cellular telephone 100. The cellular telephone 100 also has an earpiece 115 (e.g., a speaker), a microphone 120, an antenna 125, and a power button 130. The earpiece 115 delivers audible sounds to the telephone user, the microphone 120 receives voice signals from the telephone user, the antenna 125 transmits and receives radio frequency signals, and the power button 130 turns the cellular telephone 100 on and off. In one embodiment, the keypad 110 includes a SEND key 135 for initiating a call or selecting an operation, an END key 140 for terminating a call or exiting an operation, and an UP/DOWN key 145 for scrolling through operations or entries that are displayed on the display screen 105. The cellular telephone 100 houses the components shown in the block diagram of FIG. 2. Even though a cellular telephone 100 has been described, other conventional telephone can be utilized.

FIG. 2 is a block diagram 200 illustrating the principal components of the cellular telephone 100 for implementing an embodiment of the invention. The cellular telephone 100 includes a processor 205 for executing routines that are used to screen and route telephone calls. The processor 205 retrieves the routines from the program memory 215. The routines may cause the processor 205 to display menus on the display screen 105 that may be selected by the telephone user using the keypad 110. The routines are generally implemented using hardware, software, or a combination thereof. The routines can be stored in the program memory 215. The processor 205 includes an analog-to-digital (A/D) converter for converting analog voice signals, from the microphone 120, into digital voice signals that are sent to a remote telephone user via the transceiver 220 and the antenna 125. The processor 205 also includes a digital-to-analog (D/A) converter for converting digital voice signals, received from the remote telephone user, into analog voice signals that are received by the telephone user via the earpiece 115. The transceiver 220 is used to send and receive radio frequency signals to and from the processor 205 via the antenna 125. In addition, using a text input program stored in the program memory 215, the telephone user can compose a text message using the keypad 110 that can be sent to the remote telephone user.

FIG. 3 illustrates a main table 300 including, for example, a primary ring table 305, a secondary ring table 310, a voicemail table 315, a block call table 320, and a forward call table 325 that are used for screening and routing of telephone calls according to an embodiment of the invention. To screen and route telephone calls, the telephone user enters information, using the keypad 110, that can be viewed using the display screen 105 and can be stored in the data memory 210. That is, the telephone user may associate each name and/or telephone number with a table for facilitate the screening and routing of telephone calls. For example, each name and/or telephone number can be associated with one of the following tables: the primary ring table 305, the secondary ring table 310, the voicemail table 315, the block call table 320, and the forward call table 325. The name of the table generally specifies the screening and/or routing operation that is performed when a telephone call is received. The telephone user generally selects a particular table for each name and/or telephone number stored in the data memory 210. The contents of the main table 300 are generally stored in the data memory 210, which can be accessed by the processor 205.

FIG. 4 illustrates an address book 400 having an alphabetical listing of names 405 and numbers 410 with identifiers 415 that specify the screening and/or routing operation that is performed when a telephone call is received from the listed number 410. The identifiers 415 can be, for example, a primary ring (PR), a secondary ring (SR), a voicemail (VM), a block call (BC), and a forward call (FC). Each name 405 and number 410 may have a corresponding identifier 415. The identifier 415 specifies the action to be taken if a telephone call having the corresponding name 405 or number 410 is received by the cellular telephone 100.

In a first example, if the cellular telephone 100 receives a telephone call from telephone number 800-333-1111 (Mother-in-Law), the call is sent directly to voicemail without the cellular telephone 100 ringing. In one embodiment, the telephone user does not know that a telephone call was received by the Mother-in-Law unless the Mother-in-Law leaves a voicemail message for the telephone user. Hence, the telephone call is received without the telephone user knowing that the call was made and the telephone user's cellular telephone 100 does not ring. In another embodiment, the telephone user receive a message on the display screen 105 stating "Call from Mother-in-Law (800-333-1111) Sent Directly to Voicemail". This embodiment allows the telephone user to know if a telephone call has been sent directly to voicemail and the name and number of the telephone caller.

In a second example, if the cellular telephone 100 receives a telephone call from telephone number 800-444-2222, the call is blocked (i.e., a busy signal is received by the Ex-Wife or the call is disconnected or dropped). In one embodiment, the telephone user does not know that a telephone call was attempted by the Ex-Wife. The telephone call is blocked without the telephone user knowing that the call was attempted and the telephone user's cellular telephone 100 does not ring. In another embodiment, the telephone user receives a message on the display screen 105 stating "Blocked Call from Ex-Wife (800-444-2222)". This embodiment allows the telephone user to know if a telephone call has been blocked and the name and number of the telephone caller.

In a third example, if the cellular telephone 100 receives a telephone call from telephone number 800-555-3333 (Patient #1), the call can be forwarded to another person, for example, another on-call doctor at his telephone number (800-666-3333), without the cellular telephone 100 ringing. In one embodiment, the telephone user does not know that a telephone call was received by the Patient #1. Hence, the telephone call is received without the telephone user knowing that the call was made and the telephone user's cellular telephone 100 does not ring. In another embodiment, the telephone user receives a message on the display screen 105 stating "Call from Patient #1 (800-555-3333) Forwarded to Doctor #2 (800-666-3333)". This embodiment allows the telephone user to know if a telephone call has been forwarded to another user and the name and number of the telephone caller and the forwarded recipient.

In some instances, the telephone caller's telephone number is unlisted, unavailable or blocked using caller ID block or any other call blocking device. In these situations, the telephone user can set the cellular telephone 100 to perform an operation for these telephone calls. That is, the identifier 415 for the name 405 or number 410 "Caller Unavailable" can be assigned to a particular table or set to PR, SR, VM, BC or FC. For example, when a telephone call is received that is from a telephone caller that blocks his/her telephone number, the telephone call can be, for example, blocked as described herein.

In some instances, the telephone caller's telephone number is not contained in the address book 400. In these situations, the telephone user can set the cellular telephone 100 to perform an operation for these telephone calls. That is, the identifier 415 for the name 405 or number 410 "All Other Calls" can be assigned to a particular table or set to PR, SR, VM, BC or FC. For example, when a telephone call is received that is from a telephone caller not listed in the address book 400, the telephone call can be, for example, sent directly to voicemail as described herein.

The telephone user can call a particular person or edit the name 405, the number 410 and/or the identifier 415 by first moving (using the UP/DOWN key 145) a highlighted bar 425 over the desired name 405 and number 410. For example, the highlighted bar 425 is shown in FIG. 4 to be over the Spouse (800-111-1111). Then, the telephone user presses the SEND key 135, which causes a menu or window 500 to be displayed on the display screen 105 (see FIG. 5).

FIG. 5 is a menu or window 500 that is displayed on the display screen 105 when the telephone user selects one of the names 405 and/or numbers 410 in the address book 400. The menu 500 includes a call line 505, an edit information line 510, an edit identifier line 515, and a return to address book line 520. The highlighted bar 425 is shown in its default position to be over the call line 505. The telephone user can press the SEND key 135 to call the Spouse or move (using the UP/DOWN key 145) the highlighted bar 425 down the menu 500. If the edit information line 510 is selected by pressing the SEND key 135, the telephone user can edit the Spouse's information (e.g., address, telephone number, etc.). If the edit identifier line 515 is selected by pressing the SEND key 135, an identifier menu or window 600 is displayed on the display screen 105 (see FIG. 6).

Figure 6:
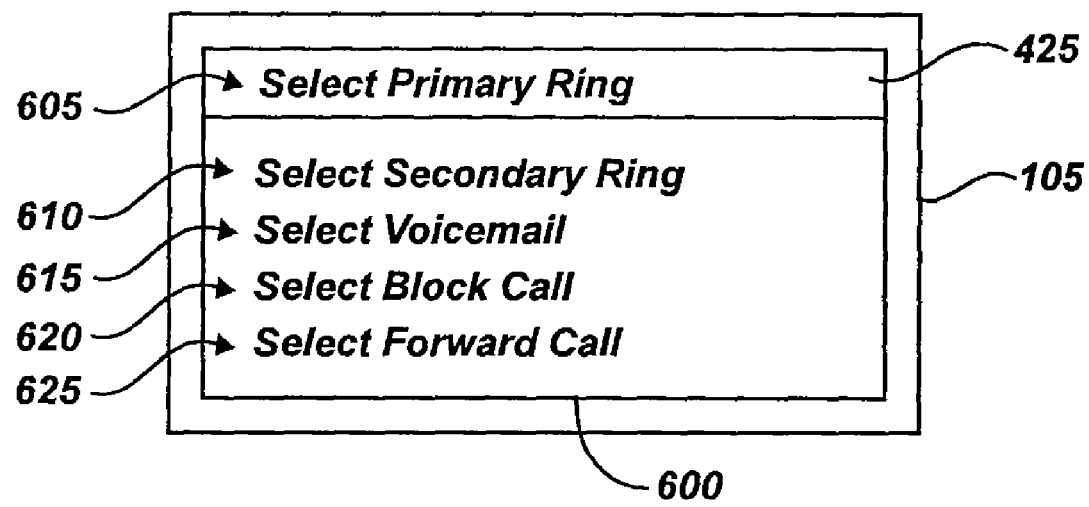
FIG. 6 is an identifier menu or window that is displayed on the display screen when the telephone user selects the edit identifier line on the menu.

FIG. 6 is an identifier menu or window 600 that is displayed on the display screen 105 when the telephone user selects the edit identifier line 515 on the menu 500. The identifier menu 600 includes a select primary ring line 605, a select secondary ring line 610, a select voicemail line 615, a select block call line 620, and a select forward call line 625. The highlighted bar 425 is shown in its default position to be over the primary ring line 605. The telephone user can press the SEND key 135 to select the highlighted line or move (using the UP/DOWN key 145) the highlighted bar 425 to another line on the identifier menu 600. If the primary ring line 605, the secondary ring line 610, the voicemail line 615 or the block call line 620 is selected by pressing the SEND key 135, the new selection is saved for the particular name 405 and/or number 410 and the telephone user is returned to the previous menu 500, which is displayed on the display screen 105 as shown in FIG. 5. If the forward call line 625 is selected by pressing the SEND key 135, the address book 400 is displayed so that the telephone user can scroll through the names 405 and/or number 410 to select the forwarding number (see FIG. 4). Optionally, the telephone user can input the name and/or number of the forwarding caller if the address book 400 does not list the forwarding caller. Once the forwarding number has been selected or input, the forwarding name and/or number is saved for the particular name 405 and/or number 410 and the telephone user is returned to the identifier menu 600.

Figure 7:
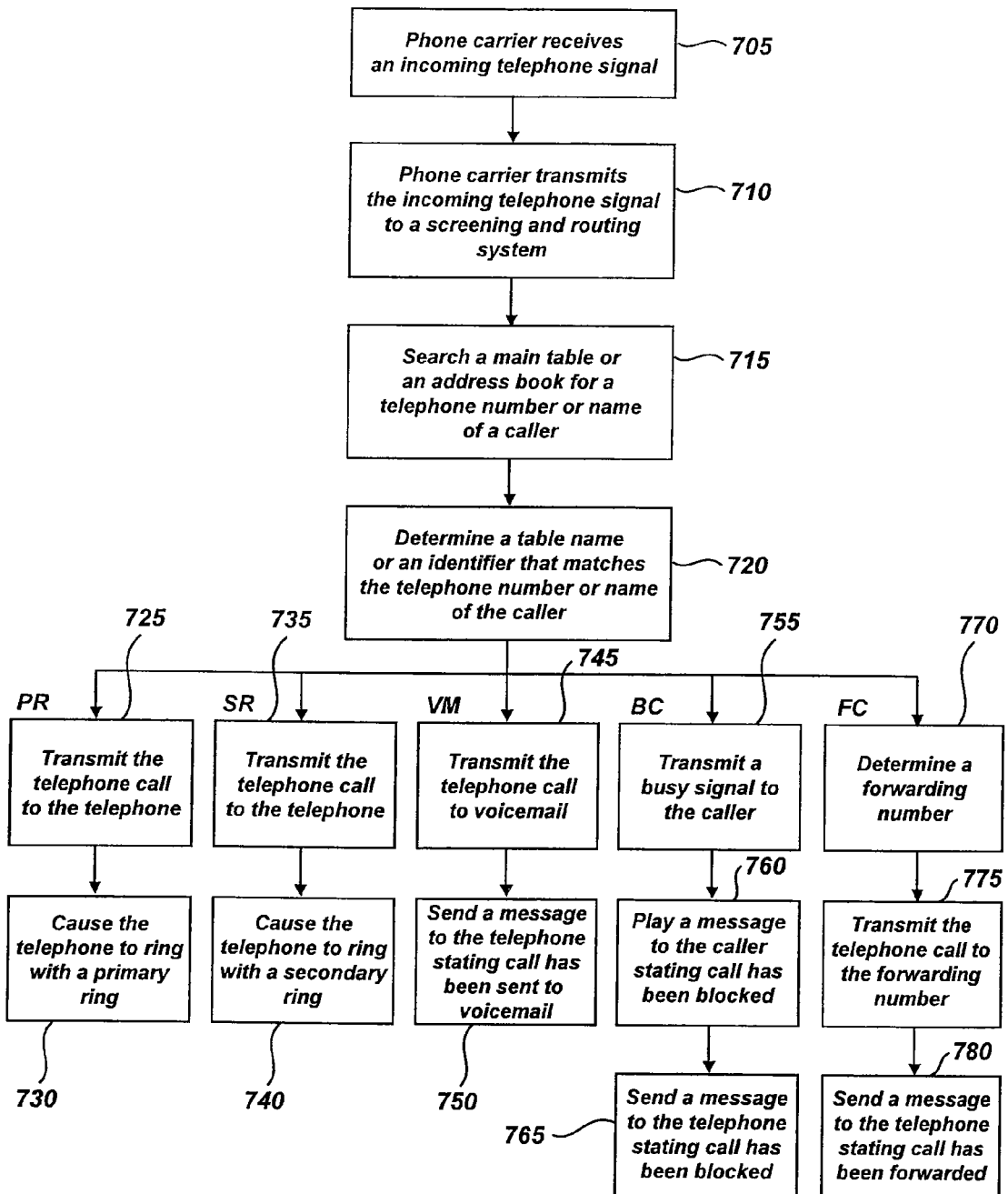
FIG. 7 is a flow chart illustrating the process of screening and routing an incoming call according to an embodiment of the invention.

FIG. 7 is a flow chart 700 illustrating the process of screening and routing an incoming call according to an embodiment of the invention. The phone carrier (e.g., Cingular Wireless) at a base station or call center receives an incoming telephone signal (705). The incoming telephone signal includes the telephone number to be called and the caller ID information of the caller. The phone carrier transmits the telephone number to be called and the caller ID information of the caller to a screening and routing system (710). The screening and routing system may be part of or connected (via a wired or wireless link) to the base station or located in the program memory 215 of the cellular telephone 100. If the screening and routing system is part of or connected to the base station, the main table 300 or the address book 400 is stored in or made available to the screening and routing system.

The screening and routing system accesses the main table 300 or the address book 400 of the telephone number to be called and locates the telephone number of the caller in the main table 300 or the address book 400 (715). The screening and routing system determines the table (e.g., primary ring table 305) that includes or the identifier 415 that matches the telephone number of the caller (720). Based on the table or the identifier 415, the screening and routing system performs one or more operations as described herein.

If the table or the identifier 415 corresponds to a primary ring, the screening and routing system sends or transmits the telephone call to the cellular telephone 100 (725) and causes or instructs the cellular telephone 100 to ring with a primary or standard ring tone (730).

If the table or the identifier 415 corresponds to a secondary ring, the screening and routing system sends or transmits the telephone call to the cellular telephone 100 (735) and causes or instructs the cellular telephone 100 to ring with a secondary or alternate ring tone (740).

If the table or the identifier 415 corresponds to voicemail, the screening and routing system sends or transmits the telephone call to the voicemail of the cellular telephone 100 without causing or instructing the cellular telephone to ring (745). In one embodiment, the screening and routing system sends or transmits a message to the display screen 105 stating "Call from [Name and Number] Sent Directly to Voicemail" (750).

If the table or the identifier 415 corresponds to a block call, the screening and routing system sends or transmits a busy signal to the caller or disconnects the caller (755). In one embodiment, the screening and routing system plays a message to the caller stating that the "Call has been Blocked by the Recipient" (760). In one embodiment, the screening and routing system sends or transmits a message to the display screen 105 stating "Call from [Name and Number] Has Been Blocked" (765).

If the table or the identifier 415 corresponds to a forward call, the screening and routing system determines the forwarding number from the table (770) and sends or transmits the telephone call to the forwarding number without causing or instructing the cellular telephone 100 to ring (775). In one embodiment, the screening and routing system sends or transmits a message to the display screen 105 stating "Call from [Name and Number] has been Forwarded to [Name and Number]" (780).

Although an exemplary embodiment of the invention has been shown and described, many other changes, combinations, omissions, modifications and substitutions, in addition to those set forth in the above paragraphs, may be made by one having skill in the art without necessarily departing from the spirit and scope of this invention. Accordingly, the invention is not intended to be limited by the preferred embodiments, but is to be defined by reference to the appended claims.

What is claimed is:

1. A method for screening and routing an incoming call from a caller, comprising:
   receiving at a cellular phone an incoming telephone signal including identification information;
   identifying at the cellular phone an entry in a data set that corresponds to the identification information, wherein the data set includes: (1) a first entry for a known caller, (2) a second entry for an undisclosed caller, and (3) a third entry for all telephone numbers or names not listed in the data set;
   performing an action by the cellular phone based on the entry in the data set that corresponds to the identification information, the action being: (1) allowing a ring tone when the corresponding entry is the first entry, (2) blocking the incoming telephone signal when the corresponding entry is the second entry, or (3) sending to a voicemail without having a ring tone when the corresponding entry is the third entry; and
   displaying an indication on a display of the cellular phone if the corresponding entry is the second entry, the indication including information associated with the incoming telephone signal and a message that the incoming telephone signal has been blocked.

2. The method of claim 1, further comprising:
   extracting at the cellular phone an identifier from the corresponding entry in the data set; and
   selecting the action performed by the cellular phone based on the identifier that is extracted.

3. The method of claim 2, further comprising:
   displaying an indication that the incoming telephone signal was sent to voicemail on the display of the cellular phone.

4. The method of claim 3, wherein the indication includes a phone number associated with the incoming telephone signal.

5. A cellular telephone having a processor and a memory, the memory storing instructions that when executed by the processor causes the cellular telephone to perform:
   extracting caller identification information from an incoming telephone call;
   storing a plurality of tables including a first ring tone table, a second ring tone table, a voicemail table, a forward table and a block call table;
   matching the caller identification information to an entry in the plurality of tables, the plurality of tables having entries including: (1) a name or telephone number entry, (2) a caller-unavailable entry where a caller name or telephone number is blocked prior to extracting caller identification information, and (3) an entry for a name or telephone number not blocked and not contained in the plurality of tables, wherein the caller-unavailable entry is included in a different table than the entry for a name or telephone number not blocked and not contained in the plurality of tables;
   blocking the incoming telephone call if the block call table includes the matched entry;
   allowing the incoming telephone call to have a first ring tone if the first ring tone table includes the matched entry;
   sending the incoming telephone call directly to voicemail without having a ring tone if the voicemail table includes the matched entry; and
   displaying on a display of the cellular telephone that the incoming telephone call has been blocked when the matched entry is included in the block call table.

6. The cellular telephone of claim 5, wherein blocking the incoming telephone call if the block call table includes the matched entry further includes playing a message to a caller that a recipient has blocked the incoming telephone call.

7. The cellular telephone of claim 5, wherein blocking the incoming telephone call if the block call table includes the matched entry further includes transmitting a busy signal to a caller.

8. The cellular telephone of claim 5, wherein the memory further stores instructions that, when executed by the processor, causes the cellular telephone to perform:
   allowing the incoming telephone call to have a second ring tone if the second ring tone table includes the matched entry; and
   forwarding the incoming telephone call if the forward table includes the matched entry.

9. The cellular telephone of claim 5, wherein the memory further stores instructions that, when executed by the processor, causes the cellular telephone to perform:
   displaying on the display of the cellular telephone that the incoming telephone call has been forwarded when the matched entry is included in the forward table.

10. A cellular device for screening and routing incoming telephone calls, comprising:
    a display;
    a transceiver configured to receive an incoming telephone call including caller identification information;
    a memory coupled to the transceiver, the memory configured to store a plurality of entries, wherein the plurality of entries include at least: (1) a name or telephone number entry, (2) a caller-unavailable entry where a caller name or telephone number is blocked prior to the incoming telephone call being received, and (3) an entry for a name or telephone number not blocked and not stored in the memory, further wherein the caller-unavailable entry is included in a different table than the entry for a name or telephone number not blocked and not stored in the memory, where each of the plurality of entries further includes an identifier selected from one of a set including (1) a primary ring, (2) a voicemail or (3) a block call; and a processor coupled to the memory, the processor configured to match the caller identification information to one of the plurality of entries and for:

allowing the incoming telephone call to have a primary ring tone if the identifier of the matched entry is the primary ring;

sending the incoming telephone call directly to voicemail without having a ring tone if the identifier of the matched entry is the voicemail;

blocking the incoming telephone call without causing a ring tone and without user interaction if the identifier of the matched entry is the block call; and displaying a message on the display if the identifier of the matched entry is the block call, the message including information associated with the incoming telephone call and indicating that the incoming telephone call has been blocked.

11. The cellular device of claim 10, wherein the cellular device is configured to block the incoming telephone call and prevent the incoming telephone call from reaching a cellular phone when the identifier of the matched entry is the block call.

12. The cellular device of claim 10, wherein the cellular device is configured to pass the incoming telephone call to a cellular phone and further instruct the cellular phone to output a primary ring tone when the identifier of the matched entry is the primary ring.

13. The cellular device of claim 10, wherein the cellular device is configured to pass the incoming telephone call to a voicemail associated with a cellular phone without causing the cellular phone to ring when the identifier of the matched entry is the voicemail.

* * * * *